United States Patent [19]

Kamogawa et al.

[11] Patent Number: 4,542,977
[45] Date of Patent: Sep. 24, 1985

[54] METHOD AND APPARATUS FOR SEPARATING RECORDING PAPER FROM IMAGE RETAINING MEMBER

[75] Inventors: Ninichi Kamogawa, Tokyo; Kenji Ueno; Kazumi Ishii, both of Hachioji, all of Japan

[73] Assignee: Konishiroku Photo Industry Co., Ltd., Tokyo, Japan

[21] Appl. No.: 532,586

[22] Filed: Sep. 15, 1983

[30] Foreign Application Priority Data

Sep. 20, 1982 [JP] Japan ............................... 57-164576

[51] Int. Cl.⁴ ............................................. G03G 21/00
[52] U.S. Cl. ............................ 355/3 CH; 355/3 TR; 361/225; 250/325
[58] Field of Search ............... 355/3 CH, 3 TR, 3 R; 361/225, 230; 271/DIG. 2; 250/324–326

[56] References Cited

U.S. PATENT DOCUMENTS

| 3,578,970 | 5/1971 | Michaud et al. ............... 361/225 |
| 3,764,866 | 10/1973 | Bonaventura et al. ......... 250/324 X |
| 3,789,278 | 1/1974 | Bingham et al. ............... 250/326 X |
| 3,813,549 | 5/1974 | Di Steffano et al. ............ 250/324 |
| 4,118,751 | 10/1978 | Hubble et al. .................. 250/324 X |
| 4,183,653 | 1/1980 | Satomi et al. ................. 271/DIG. 2 |
| 4,190,348 | 2/1980 | Friday ............................ 250/325 X |
| 4,252,310 | 2/1981 | Kono et al. .................. 271/DIG. 2 |

OTHER PUBLICATIONS

*IBM Tech Disc Bull*, "Charge Corona Edge Shield", vol. 15, No. 7, Dec. '72, p. 2060.

*Primary Examiner*—Richard L. Moses
*Attorney, Agent, or Firm*—Frishauf, Holtz, Goodman & Woodward

[57] ABSTRACT

In a recording apparatus, a recording paper is separated from an image retaining member after the transfer of a toner image onto the recording paper by generating an a.c. corona discharge so as to eliminate or reduce electrostatic forces generated between the image retaining member and the recording paper. An insulator is arranged between the separating electrode and the recording paper during the a.c. corona discharge so as to moderate the sharpness of the spatial distribution of the corona discharge current.

6 Claims, 8 Drawing Figures

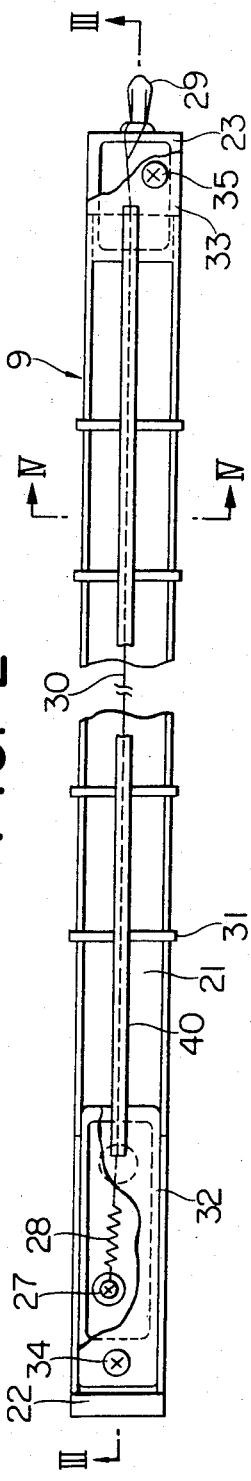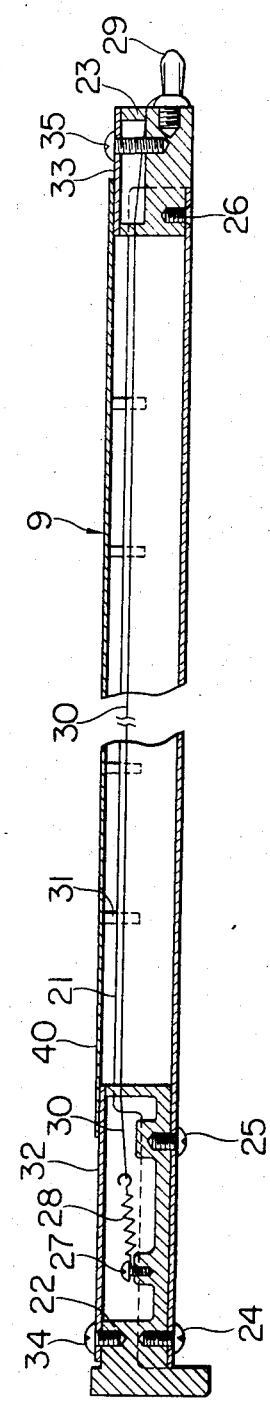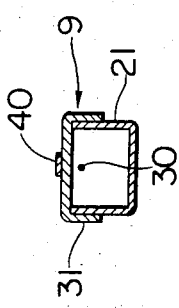

METHOD AND APPARATUS FOR SEPARATING RECORDING PAPER FROM IMAGE RETAINING MEMBER

BACKGROUND OF THE INVENTION

This invention relates to a method for separating a recording paper from an image retaining member in which electrostatic forces between the image retaining member and the recording paper may be eliminated or reduced by means of a.c. corona discharge for separation of the recording paper from the image retaining member, and to an apparatus therefor.

In an electrostatic apparatus such as an electrophotographic copier, a copy paper must be separated from an image retaining member after a visible toner image is transferred from the latter to the former. For the above copy paper separation, various methods have been proposed and put into practical use. For example, a pneumatic method making use of an air jet, a mechanical method making use of a belt or claw, and an electrostatic method by which attractive forces between the image retaining member and copy paper are removed under a.c. or d.c. charging to the reverse polarity of neutralization for paper separation. Though these methods have their own merits and demerits, the electrostatic method making use of a.c. corona discharge is most often adapted from the total point of view. The reason is because the image can be transferred to the whole page of copy paper without soiling such paper, and the image retaining member such as a photoconductor is free from damage such as scratches.

However, the electrostatic method of copy paper separation causes some problems. Namely, the separation performance of the electrostatic method depends on the type of copy image and is inferior in degree of reliable performance of separation when compared to the mechanical method making use of a belt.

SUMMARY OF THE INVENTION

It is an object of the present invention to provide a copy paper separating method for electrostatic recording apparatus in which the separating performance is not affected by any type of copy image and the separation reliability thereof is high, and to provide an apparatus for electrostatic recording employing the described method.

In a method by which attractive forces between the image retaining member and copy paper are removed or reduced by means of a.c. corona discharge for separation of the copy paper from the image retaining member, a method and apparatus of electrostatic recording of the invention solve the problems of image-dependent separation performance and inferior reliability in separation as mentioned above, by disposing an insulator between a separating electrode giving rise to the a.c. corona discharge and a copy paper so as to moderate the sharpness of the spatial distribution of corona discharge current.

BRIEF DESCRIPTION OF THE DRAWINGS

FIG. 2 is a plan view of a separator electrode embodied according to the method of the invention;

FIG. 3 is a sectional view of a separator electrode embodied according to the invention, taken along the line III—III of FIG. 2;

FIG. 4 is a sectional view of a separator electrode embodied according to the invention, taken along the line IV—IV of FIG. 2;

DETAILED DESCRIPTION OF THE INVENTION

Figure 1:
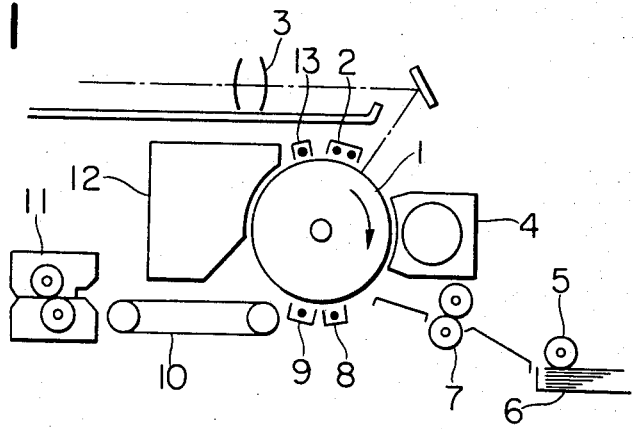
FIG. 1 is an example of the configuration of a principal mechanism of a copier unit to which the invention pertains.

FIG. 1 shows an example of device embodying the present invention, illustrating the principal mechanism of a copier unit wherein an image carrier or an image retaining member is a rotatable cylindrical drum having an axis. In the figure, a photoconductor drum 1 has a photoconductive layer, for example, made of selenium in its surface, and the layer is charged by corona discharge generated by a charging electrode 2. An optical system 3 projects a reflected beam of light from an original image placed on an original table (not shown) onto the surface of photoconductor drum 1 to form an electrostatic latent image while a developing unit 4 develops such latent image with toner to form a visible toner image. A first feed roller 5 feeds copy papers stacked in a paper cassette 6 one by one to a prescribed position; a pair of second feed rollers 7 feed each copy paper in a prescribed timing so that it may accurately overlap the visible toner image formed on the surface of photoconductor drum 1; and a transfer electrode 8 generates d.c. corona discharge to transfer the visible toner image from the drum surface to the copy paper. A separating electrode 9 generates a.c. corona discharge to eliminate or reduce electrostatic forces between the surface of photoconductor drum 1 and the copy paper; a conveyor unit 10 conveys the copy paper separated from the surface of photoconductor drum 1 to a fixing unit 11; a cleaning unit 12 cleans off the residual toner remaining on the surface of photoconductor drum 1; and a preconditioning lamp 13 preexposes the entire surface of photoconductor drum 1 in advance of the start of the next copy cycle.

The separating electrode 9 according to the present invention is constructed as illustrated in FIGS. 2, 3 and 4. In these figures, an electrically conductive shield 21 made of aluminium or the like is U-shaped in cross section and insulator blocks 22 and 23 are mounted to the opposite ends of this shield 21, respectively, by screws 24, 25 and 26. A high voltage plug connector 29 is mounted to protrude from the insulator block 23. One end of a spring 28 is mounted by a screw 27 to the insulator block 22, and a piece of wire 30 having, e.g., a diameter of 0.08 mm and made of tungsten is stretched or extended between the plug connector 29 and the other end of the spring 28. The wire 30 extends substantially perpendicular to the direction of the movement of the image retaining member such as photoconductor drum 1. Bridges 31 are fitted to the shield 21 and arc arresters 32 and 33 are secured by plastic screws 34 and 35 to the insulator blocks 22 and 23, respectively. A thin strip insulator 40 having an appropriate width composed, for example, of polyethylene terephthalate or nylon stretches between the arc arresters 32 and 33 and in the parallel direction of the wire 30. The insulator covers an effective portion of the wire for generating the a.c. corona discharge. Though, in this embodiment, the insulator 40 is integrated with the separator electrode, it can be disposed independently between the separator electrode and the copy paper.

By contrast to the prior art wherein the above insulator 40 is not used, the copy paper separating method of the present invention contemplates the application of a.c. corona discharge through such interposed insulator 40. The value of proper a.c. corona discharge current to pass through the separator electrode for effective separation of the copy paper depends on whether there is a black image toward the leading edge of the copy paper. Table 1 shows an example of separating performance achieved by the separating method of prior art. The open circle "o" indicates good separation while the mark "x" indicates poor separation. In this experiment, the circumferential velocity of the photoconductive drum was 180 mm/sec., and the frequency of a.c. corona discharge was 500 Hz. Voltage charged on the photoconductor was +750 V, and the ampere for transfer was +40 uA. The experiments of conveyance, transfer and separation were conducted with copy papers of 64 g/m² in A4 size by setting the longitudinal side of the copy paper in parallel with the axis of the drum. In the table, the results in row A are obtained with an original copy which has a black image in a 40 mm wide margin at the leading edge, while those in row B refer to a blank original copy.

TABLE 1

| Original copy | Performance at a.c. corona discharge current (uA) of | | | | | |
|---|---|---|---|---|---|---|
| | 40 | 50 | 60 | 70 | 80 | 90 |
| A | o | o | o | o | x | x |
| B | x | x | o | o | o | o |

As is clear from the above table, it is only in a narrow range of a.c. corona discharge current that the separating method of the prior art can separate the copy paper favorably regardless of the type of original copy used. Such narrow range changes, for example, depending on the thickness and size of the copy paper. This is why the separating method of the prior art has the problem that it is difficult to keep a wide range of a.c. corona discharge current, generated by a separation electrode, capable of separating copy paper with excellent results. Table 2 shows separating performances that were observed when the insulator 40 was disposed in accordance with the method of the invention and the a.c. corona discharge current was changed. The table indicates a substantial extension of the a.c. corona discharge current range in which the copy paper can be separated favorably. The transfer current level and the meaning of symbols "A", "B", "o" and "x" are the same as in Table 1.

TABLE 2

| Original copy | Performance at a.c. corona discharge current of | | | | | | | | |
|---|---|---|---|---|---|---|---|---|---|
| | 70 | 80 | 90 | 100 | 110 | 120 | 130 | 140 | 150 |
| A | o | o | o | o | o | o | o | o | o |
| B | x | x | x | o | o | o | o | o | o |

Results in Table 2 were obtained when the insulator 40 comprising a polyethylene terephthalate strip 0.1 mm thick and 1.8 mm wide was disposed with a separation or spacing of 3 mm away from the wire 30. Similar results were obtained when the thickness or the width of insulator 40 was changed to 0.2 and 0.3 mm or 1.5 and 2 mm, respectively, or when the insulator 40 was shifted slightly in the widthwise direction.

In this example, there is disposed a thin strip insulator 40 in a narrow width. However, insulator 40 need not be limited to such a thin strip and a similar effect is also obtained by making use of other types of insulators, for example, a wire type insulator in which a plurality of wires are stretched in parallel with charging electrode 2.

Figure 5:
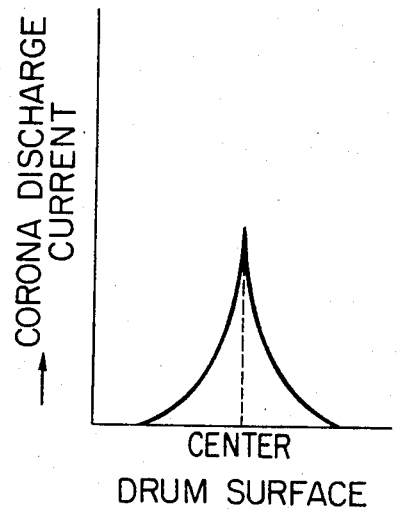
FIG. 5 is a spatial distribution of corona discharge current achieved by a paper separation method of the prior art.
Figure 7:
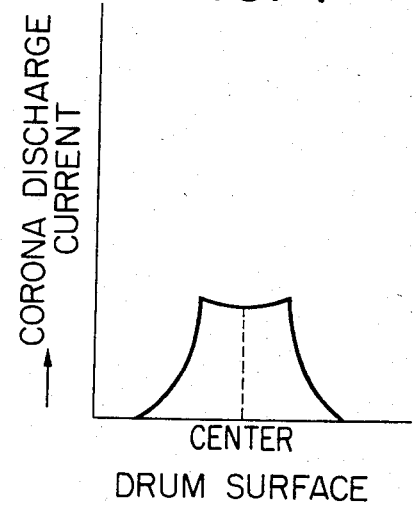
FIG. 7 is a spatial distribution of corona discharge current achieved by the method of the present invention.
Figure 6:
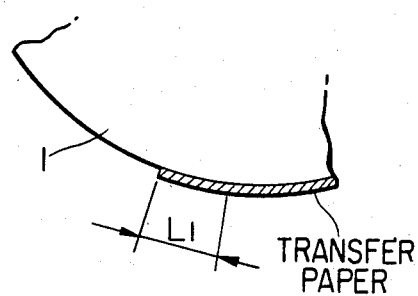
FIG. 6 shows how a copy paper is charged by a paper separation method of the prior art.
Figure 8:
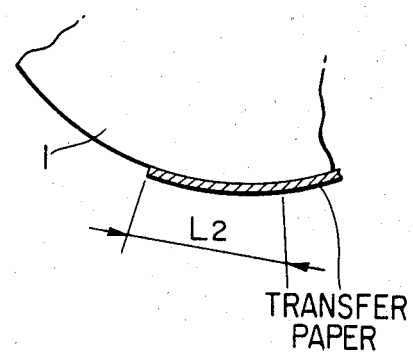
FIG. 8 shows how a copy paper is charged by the method of the present invention.

As the blank image portion of copy paper is separated from the image retaining member, the higher the a.c. corona discharge current, the better the separation. In case of the black image portion, however, as the a.c. corona discharge current is increased, the charging polarity in the copy paper is ultimately reversed from positive to negative, causing the adherence of copy paper to the photoconductor drum, so it becomes rather difficult to separate the copy paper. Even if a photoconductor charged in positive polarity is developed by negative-charged toners, the neutralization is of only the order of one fifth of a positive latent image. In this instance, the copy paper is caused to be charged in negative polarity, because a.c. corona charging acts so as to neutralize the surface potential of the whole of layers overlapped with the photoconductor charged in positive polarity, toners charged in negative polarity which adheres to the photoconductor, and copy paper put on the toners. In the prior art, there was adapted a method making use of a spatial distribution of corona discharge current having a sharp peak as shown in FIG. 5. As a result, the copy paper changes its polarity from positive to negative while it passes over the separator electrode in a short distance in the feeding direction of the copy paper, so only a very short margin shown as $L_1$ in FIG. 6 of the copy paper is fully or almost neutralized, which causes the paper separation liable to a failure. By contrast, since the method of the present invention uses a different spatial distribution of corona discharge current which lacks the prior sharp peak, and is generally flat through a region about center as shown in FIG. 7, charging to the reverse polarity as above mentioned occurs after passage of a substantially longer distance shown as $L_2$ in FIG. 8.

Therefore a longer margin of the copy paper is fully or almost kept neutralized so as to separate the paper. In addition, not only the resiliency of the copy paper but the weight of its $L_2$ portion can be effective to facilitate the paper separation, resulting in a good separation performance.

It is noted that electrostatic recording apparatus to which the present invention pertains include not only the above-described example of electrostatic copiers, but also an electrophotographic type laser printer and the like.

As mentioned above, the range of a.c. corona discharge current capable of giving excellent separating performance can be widened by means of the copy paper separation device of the present invention, and therefore, the paper separation is performed favorably and reliably without being affected by the type of original copy.

What is claimed is:

1. A recording paper separating device for separating a recording paper from a moveable image retaining member, the recording paper retaining a visible toner image thereon, which comprises;
   a separating electrode means for generating a.c. corona discharge in a spatial distribution relative to the surface of the image retaining member so as to eliminate or reduce electrostatic forces generated between said image retaining member and said recording paper;
   said separating electrode means comprising:
   an electrically conductive shield having two ends;
   an insulator block arranged on each end of said conductive shield;
   a high voltage plug connector mounted on one of said insulator blocks;
   a tungsten corona discharging wire extending between said plug connector and the other of said insulator blocks and extending in a direction substantially perpendicular to the direction of movement of said image retaining member; and
   arc arresters arranged on the upper portion of each of said insulator blocks; and
   an insulator in the form of a strip arranged in spaced relation with said wire and interposed between the surface of the image retaining member and said wire, said insulator extending between said arc arresting substantially in parallel with said wire, the space between said insulator and said wire being such that the special distribution of corona discharge current generated by said separating electrode is flattened and without peaks which would otherwise be present in the absence of said insulator, so that a greater margin of a recording paper on the moving retaining member is substantially neutralized by the corona discharge for separation from the retaining member.

2. The recording paper separating device of claim 1, wherein said insulator is spaced about 3 mm. away from said wire.

3. The recording paper separating device of claim 1, wherein said insulator is polyetheylene telephthalate.

4. The recording paper separating device of claim 1, wherein said insulator is almost as long as said wire and wider than said wire.

5. The recording paper separating device of claim 1, wherein said insulator extends over said wire.

6. The recording paper separating device of claim 4, wherein said insulator extends over said wire.

* * * * *